(12) United States Patent
O'Dell et al.

(10) Patent No.: US 12,079,611 B2
(45) Date of Patent: Sep. 3, 2024

(54) PATCH UNINSTALLATION USING A SIGNED OPERATING SYSTEM INSTALL PACKAGE

(71) Applicant: Dell Products L.P., Round Rock, TX (US)

(72) Inventors: Jared O'Dell, Tacoma, WA (US); Zhao Lijun, Yangpu District (CN); Wei Hao, Yangpu District (CN); Jingjing Pu, Yangpu District (CN)

(73) Assignee: DELL PRODUCTS L.P., Round Rock, TX (US)

( * ) Notice: Subject to any disclaimer, the term of this patent is extended or adjusted under 35 U.S.C. 154(b) by 83 days.

(21) Appl. No.: 17/660,347

(22) Filed: Apr. 22, 2022

(65) Prior Publication Data
US 2023/0342132 A1 Oct. 26, 2023

(51) Int. Cl.
G06F 9/44 (2018.01)
G06F 8/61 (2018.01)
G06F 8/71 (2018.01)
G06F 21/60 (2013.01)
G06F 21/62 (2013.01)

(52) U.S. Cl.
CPC .......... *G06F 8/62* (2013.01); *G06F 8/71* (2013.01); *G06F 21/602* (2013.01); *G06F 21/6218* (2013.01)

(58) Field of Classification Search
None
See application file for complete search history.

(56) References Cited

U.S. PATENT DOCUMENTS

| | | | |
|---|---|---|---|
| 6,438,749 B1 * | 8/2002 | Chamberlain | G06F 11/1433 714/E11.135 |
| 6,523,118 B1 * | 2/2003 | Buer | G06F 21/71 713/192 |
| 7,730,295 B1 * | 6/2010 | Lee | G06F 9/4401 713/1 |
| 7,765,592 B2 * | 7/2010 | Wang | G06F 8/65 714/15 |

(Continued)

OTHER PUBLICATIONS

Richard Wilkins et al., "The Chain of Trust", Jun. 2016 (Year: 2016).*

*Primary Examiner* — Wei Y Zhen
*Assistant Examiner* — Lanny N Ung
(74) *Attorney, Agent, or Firm* — Amin, Turocy & Watson, LLP

(57) ABSTRACT

A system can determine to uninstall a patch that is installed on a computer, wherein an image of an operating system of the computer and a package that was used to install the patch are cryptographically signed. The system can further identify a first stored location of the package, and a second stored location of the image of the operating system. The system can further extract a file manifest from the package at the first stored location. The system can further extract versions of files identified on the file manifest from the image of the operating system at the second stored location, resulting in extracted versions of files. The system can further store the extracted versions of files to a temporary storage location. The system can further move the extracted versions of files in the temporary storage location to respective original running locations of the versions of files.

20 Claims, 12 Drawing Sheets

(56) References Cited

U.S. PATENT DOCUMENTS

| | | | |
|---|---|---|---|
| 10,089,108 B1* | 10/2018 | Noble | G06F 8/65 |
| 10,552,176 B1* | 2/2020 | Putney | G06F 8/71 |
| 2006/0048129 A1* | 3/2006 | Napier | G06F 8/62 |
| | | | 717/168 |
| 2006/0080656 A1* | 4/2006 | Cain | G06F 8/65 |
| | | | 434/118 |
| 2007/0168956 A1* | 7/2007 | Moore | G06F 8/60 |
| | | | 717/120 |
| 2021/0182047 A1* | 6/2021 | O'Dell | G06F 8/65 |
| 2022/0385478 A1* | 12/2022 | Cossel | H04L 9/3247 |

* cited by examiner

600

(602)

IN RESPONSE TO DETERMINING TO UNINSTALL A PATCH THAT WAS INSTALLED ON A COMPUTER WITH A PACKAGE, EXTRACTING A FILE MANIFEST FROM THE PACKAGE 604

EXTRACTING VERSIONS OF FILES IDENTIFIED ON THE FILE MANIFEST FROM AN IMAGE OF AN OPERATING SYSTEM THAT IS INSTALLED ON THE COMPUTER TO A TEMPORARY STORAGE LOCATION 606

MOVING THE VERSIONS OF FILES IN THE TEMPORARY STORAGE LOCATION TO RESPECTIVE ORIGINAL RUNNING LOCATIONS OF THE VERSIONS OF FILES 608

DETERMINING THAT THE PACKAGE IS OMITTED FROM A PACKAGE CATALOG MAINTAINED BY A COMPUTING CLUSTER THAT COMPRISES THE COMPUTING DEVICE 904

↓

DOWNLOADING THE PACKAGE FROM A REMOTE COMPUTING DEVICE ASSOCIATED WITH AN OWNER OF THE PACKAGE, WHEREIN THE REMOTE COMPUTING DEVICE IS THE FIRST STORED LOCATION 906

DOWNLOADING THE PACKAGE, RESULTING IN A DOWNLOADED PACKAGE 1004

STORING THE DOWNLOADED PACKAGE IN THE PACKAGE CATALOG 1006

PATCH UNINSTALLATION USING A SIGNED OPERATING SYSTEM INSTALL PACKAGE

BACKGROUND

Computers can run operating systems. These operating systems can be installed with cryptographically signed install packages. These operating systems can also be patched with cryptographically signed install packages.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can determine to uninstall a patch that is installed on a computer, wherein an image of an operating system of the computer is cryptographically signed, and wherein a package that was used to install the patch is cryptographically signed. The system can further identify a first stored location of the package, and a second stored location of the image of the operating system. The system can further extract a file manifest from the package at the first stored location. The system can further extract versions of files identified on the file manifest from the image of the operating system at the second stored location, resulting in extracted versions of files. The system can further store the extracted versions of files to a temporary storage location. The system can further move the extracted versions of files in the temporary storage location to respective original running locations of the versions of files.

An example method can comprise, in response to determining to uninstall a patch that was installed on a computing device with a package, identifying, by a system comprising a processor, a first stored location of the package, and a second stored location of an image of an operating system of the computing device. The method can further comprise extracting, by the system, a file manifest from the package at the first stored location. The method can further comprise extracting, by the system, versions of files, identified on the file manifest from the image of the operating system at the second stored location, to a temporary storage location. The method can further comprise moving, by the system, the versions of files in the temporary storage location to respective original executing locations of the versions of files.

An example non-transitory computer-readable medium can comprise instructions that, in response to execution, cause a system comprising a processor to perform operations. These operations can comprise, in response to determining to uninstall a patch that was installed on a computer with a package, extracting a file manifest from the package. These operations can further comprise extracting versions of files identified on the file manifest from an image of an operating system that is installed on the computer to a temporary storage location. These operations can further comprise moving the versions of files in the temporary storage location to respective original running locations of the versions of files.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 6 illustrates an example process flow that can facilitate patch uninstallation using a signed operating system install package, in accordance with an embodiment of this disclosure;

FIG. 9 illustrates an example process flow that can facilitate patch uninstallation using a signed operating system install package, in accordance with an embodiment of this disclosure;

FIG. 10 illustrates an example process flow that can facilitate patch uninstallation using a signed operating system install package, in accordance with an embodiment of this disclosure;

DETAILED DESCRIPTION

Overview

Figure 1:
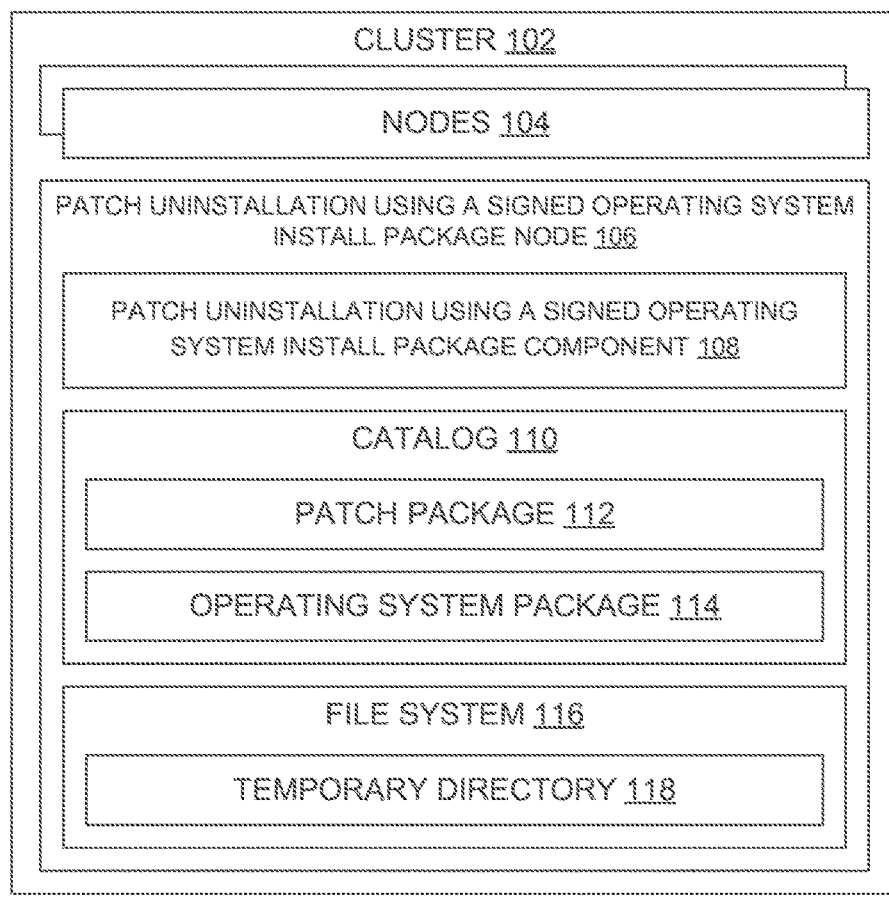
FIG. 1 illustrates an example system architecture that can facilitate patch uninstallation using a signed operating system install package, in accordance with an embodiment of this disclosure.

While the present examples generally involve computing clusters, it can be appreciated that they can be applied more generally to individual computers. The present techniques can be implemented to uninstall patches from a computer while using only package files that have been officially signed cryptographically. This can be performed by using an original signed operating system (OS) upgrade image to restore files that were previously modified by a patch that is being uninstalled.

Some prior approaches for uninstalling packages involve creating an uninstall package on the node when first installing the patch. This uninstall package can contain original versions of files that are modified by the patch. A problem with this approach is that it can be impossible to create officially signed uninstall packages on the system, since the entity creating the uninstall package can differ from the entity that created the corresponding install package. A self-signed uninstall package can be created, but this self-signed package lacks the same chain-of-trust as an officially signed package.

In the present techniques, by using only officially signed packages, a chain of trust can be verified for all packages used on the system, and the use of unauthorized packages at any point during the upgrade process can be prevented.

In some prior techniques, signed packages for operating system patches are not enforced. An approach in this scenario can be to create an unsigned uninstall package to be used when uninstalling the patch. This approach can create a vulnerability because, if a user were able to modify this package, then unauthorized files could be deployed to the computer when the patch is installed. The use of deploying unauthorized files can be performed to elevate privileges on a computing cluster where the patch uninstall occurs. For context, on a compliance node cluster, it can be that not even a system administrator is allowed to gain root privileges. This vulnerability is possible when relying on an unsigned uninstall package.

Approaches to address problems with unsigned uninstall packages can include self-signed packages, or packages that are stored in a secure area. However, an issue with self-signed packages can be that there is not the same chain-of-trust as there is with officially-signed packages. This can make a self-signed package only as secure as the signing keys that are kept on the node for signing it. If these keys become lost or damaged, then all self-signed uninstall packages can become unverifiable, and therefore unusable without risking cluster integrity.

Storing the uninstall package in a secure location can have support issues where an uninstall package is missing or damaged. In these cases, it can be necessary for an administrator to transfer the uninstall package from another node to facilitate a patch removal process. Once again, cluster integrity can be compromised by using modified uninstall packages where an administrator is trusted to interact with unsigned or self-signed packages.

The present techniques can be implemented as follows. When a patch is uninstalled from a system, the original files that were modified by the patch can be restored.

The present techniques can be implemented as follows. When a patch is uninstalled from the system, the original files that were modified by the patch can be restored. Previously, this could be done by creating an uninstall package with original versions of the files being modified. This package can later be extracted to a node when uninstalling the patch. In some examples, this approach does not work when requiring signed packages because there is no way to sign the uninstall package on the system. Instead, the present techniques can be implemented to store the original install media in a catalog so that the original copies of any modified files can be retrieved from an officially signed package. When uninstalling a signed patch, the following steps can be performed:
1. Locate the signed package for the patch that is being uninstalled in the catalog.
2. Locate the signed package for the base operating system in the catalog.
3. Extract the uninstall scripts and file manifest from the signed patch.
4. Extract the original versions of files listed on the patch manifest from the base operating system package to a temporary directory.
5. Run the pre-uninstall scripts to prepare the system for patch uninstallation (that is, stop services, etc.).
6. Move the base operating system files from the temporary directory to the original running location on the system.
7. Run the post-uninstall scripts to resume system operation (that is, update configs, start services, etc.).

The present techniques can be implemented to allow patch removal without requiring the use of any unsigned packages. In some examples, all files used according to the present techniques are either obtained from the original signed patch package or the original base operating system package. Both of these packages can be officially signed with verifiable chain-of-trust back to the certificate authority. This differs from a self-signed package by the cluster, where while a self-signed package is cryptographically signed, it lacks a verifiable chain-of-trust back to the certificate authority.

In the event that required signed packages are not available (e.g., they have been removed from the cluster or have become damaged), the original signed packages can be re-downloaded from a support website and re-imported into a catalog when needed.

Example Architectures

FIG. 1 illustrates an example system architecture 100 that can facilitate patch uninstallation using a signed operating system install package, in accordance with an embodiment of this disclosure.

System architecture 100 comprises cluster 102, nodes 104, patch uninstallation using a signed operating system install package node 106, patch uninstallation using a signed operating system install package component 108, catalog 110, patch package 112, operating system package 114, file system 116, and temporary directory 118. It can be appreciated that the components of system architecture 100 are presented logically, and that other system architectures can be implemented to facilitate the present techniques.

Figure 12:
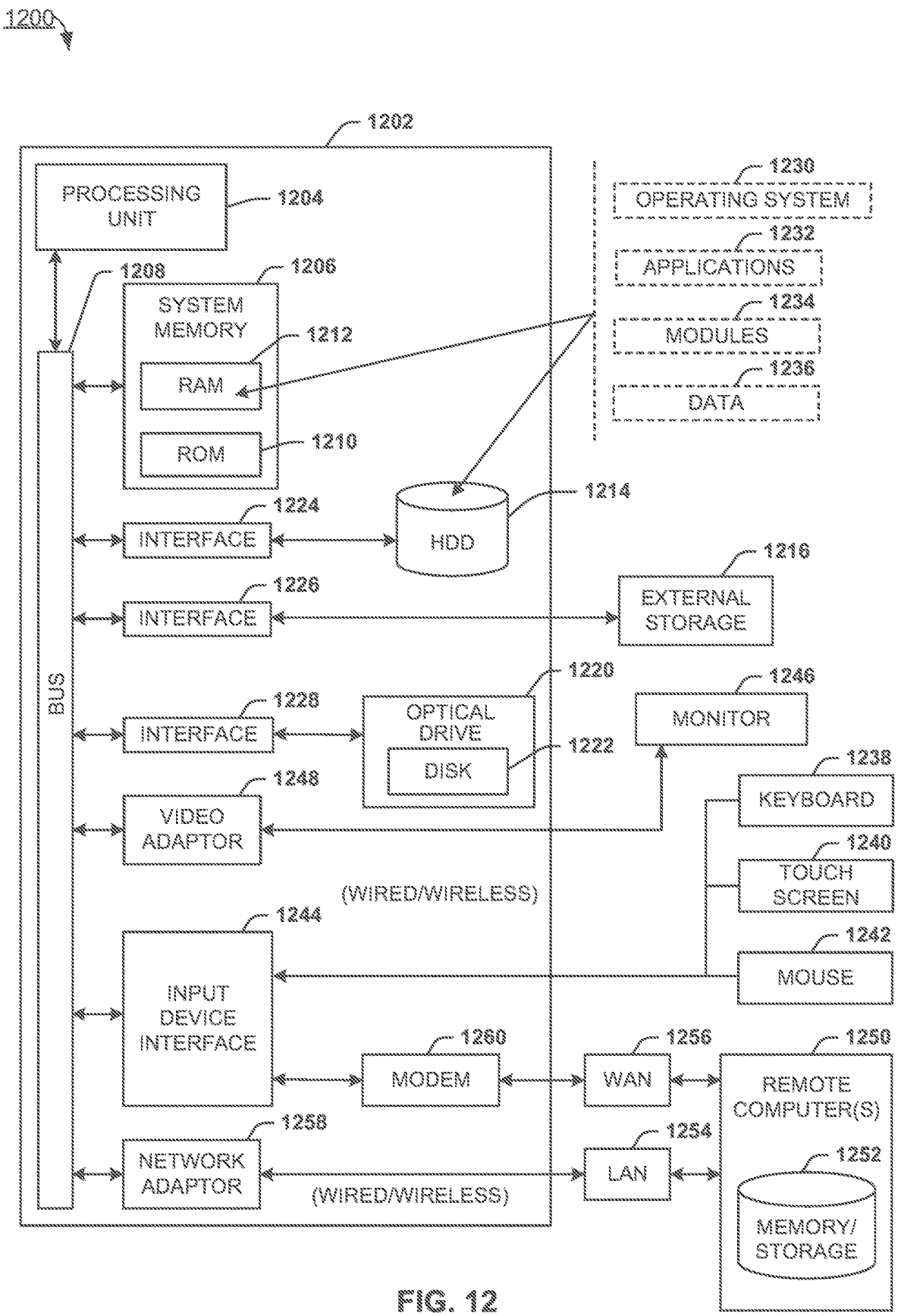
FIG. 12 illustrates an example block diagram of a computer operable to execute an embodiment of this disclosure.

Each of cluster 102, each node of nodes 104, and/or patch uninstallation using a signed operating system install package node 106 can be implemented with part(s) of computing environment 1200 of FIG. 12.

Cluster 102 can comprise a collection of computing nodes (e.g., nodes 104 and patch uninstallation using a signed operating system install package node 106) that operate together to function logically as one computing system.

Patch uninstallation using a signed operating system install package node 106 comprises catalog 110, which stores patch package 112 and operating system package 114. Each of patch package 112 and operating system package 114 can contain files and/or other data used to perform a patch uninstall while utilizing files from cryptographically signed packages.

Patch uninstallation using a signed operating system install package component 108 can perform a patch uninstallation on file system 116. As part of performing a patch uninstallation, patch uninstallation using a signed operating system install package component 108 can store certain files in temporary directory 118.

In some examples, patch uninstallation using a signed operating system install package component 108 can implement part(s) of the process flows of FIGS. 3-11 to facilitate patch uninstallation using a signed operating system install package.

It can be appreciated that system architecture 100 is one example system architecture for patch uninstallation using a signed operating system install package, and that there can be other system architectures that facilitate patch uninstallation using a signed operating system install package.

Figure 2:
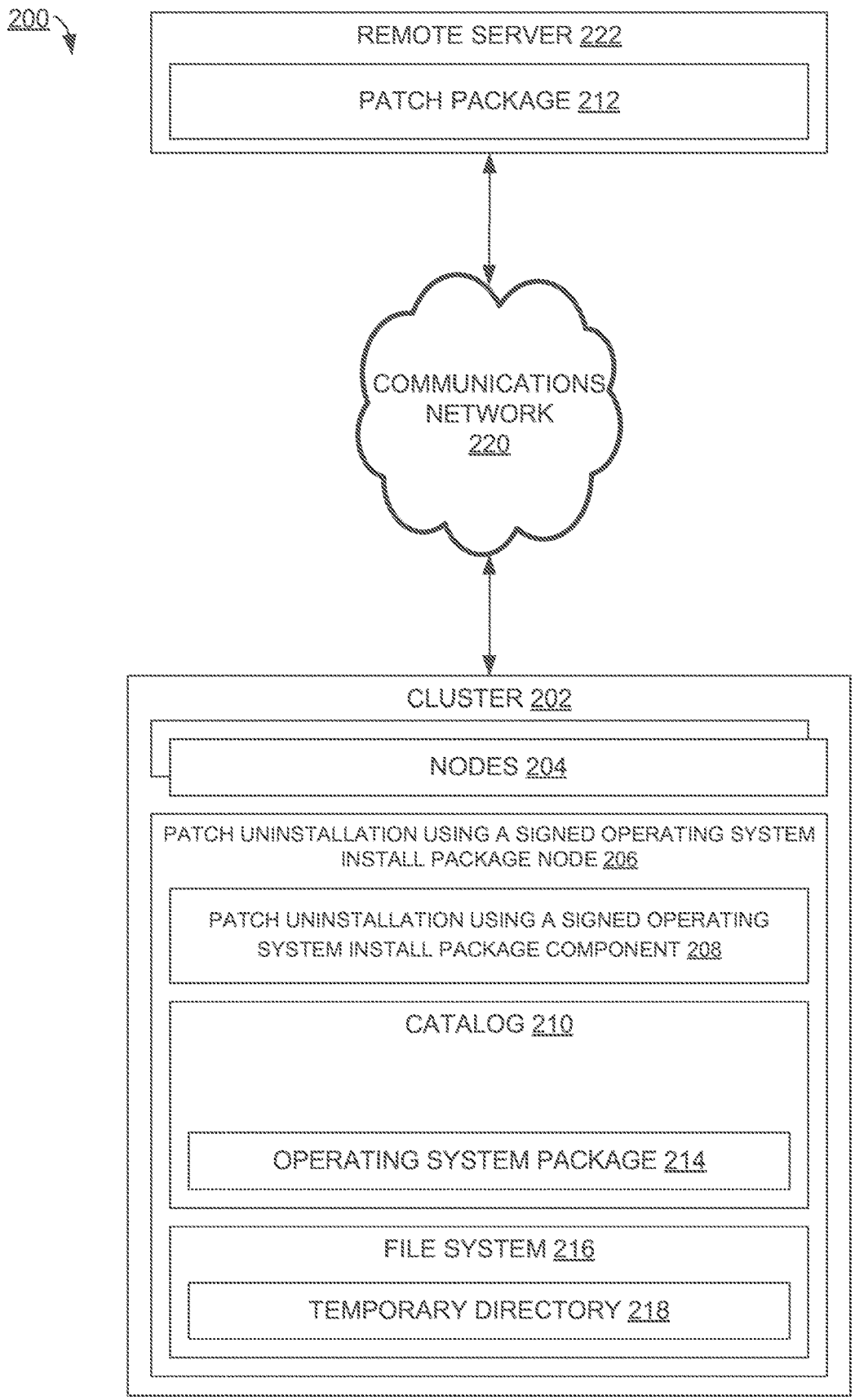
FIG. 2 illustrates another example system architecture that can facilitate patch uninstallation using a signed operating system install package, in accordance with an embodiment of this disclosure.

FIG. 2 illustrates another example system architecture 200 that can facilitate patch uninstallation using a signed operating system install package, in accordance with an embodiment of this disclosure. System architecture 200 can be similar to system architecture 100 of FIG. 1. A difference between system architecture 200 and system architecture 100 can be that, in system architecture 200, a patch package is not found in a catalog and can be downloaded from a remote server.

System architecture 200 comprises cluster 202 (which can be similar to cluster 102 of FIG. 1), nodes 204 which can be similar to nodes 104), patch uninstallation using a signed operating system install package node 206 (which can be similar to patch uninstallation using a signed operating system install package node 106), patch uninstallation using a signed operating system install package component 208 (which can be similar to patch uninstallation using a signed operating system install package component 108), catalog 210 (which can be similar to catalog 110), patch package 212 (which can be similar to patch package 112), operating system package 214 (which can be similar to operating system package 114), file system 216 (which can be similar to file system 116), temporary directory 218 (which can be similar to temporary directory 118), communications network 220, and remote server 222.

Remote server 222 can be implemented with part(s) of computing environment 1200 of FIG. 12. Communications network 220 can comprise a computer communications network, such as the Internet.

In system architecture 200, patch package 212 is not found in catalog 210. Patch uninstallation using a signed operating system install package component 208 can search for a patch package in catalog 210, and not finding it, then download patch package 212 from remote server 222. Patch uninstallation using a signed operating system install package component 208 can store the downloaded patch package in catalog 210 as part of performing patch uninstallation using a signed operating system install package.

Example Process Flows

Figure 3:
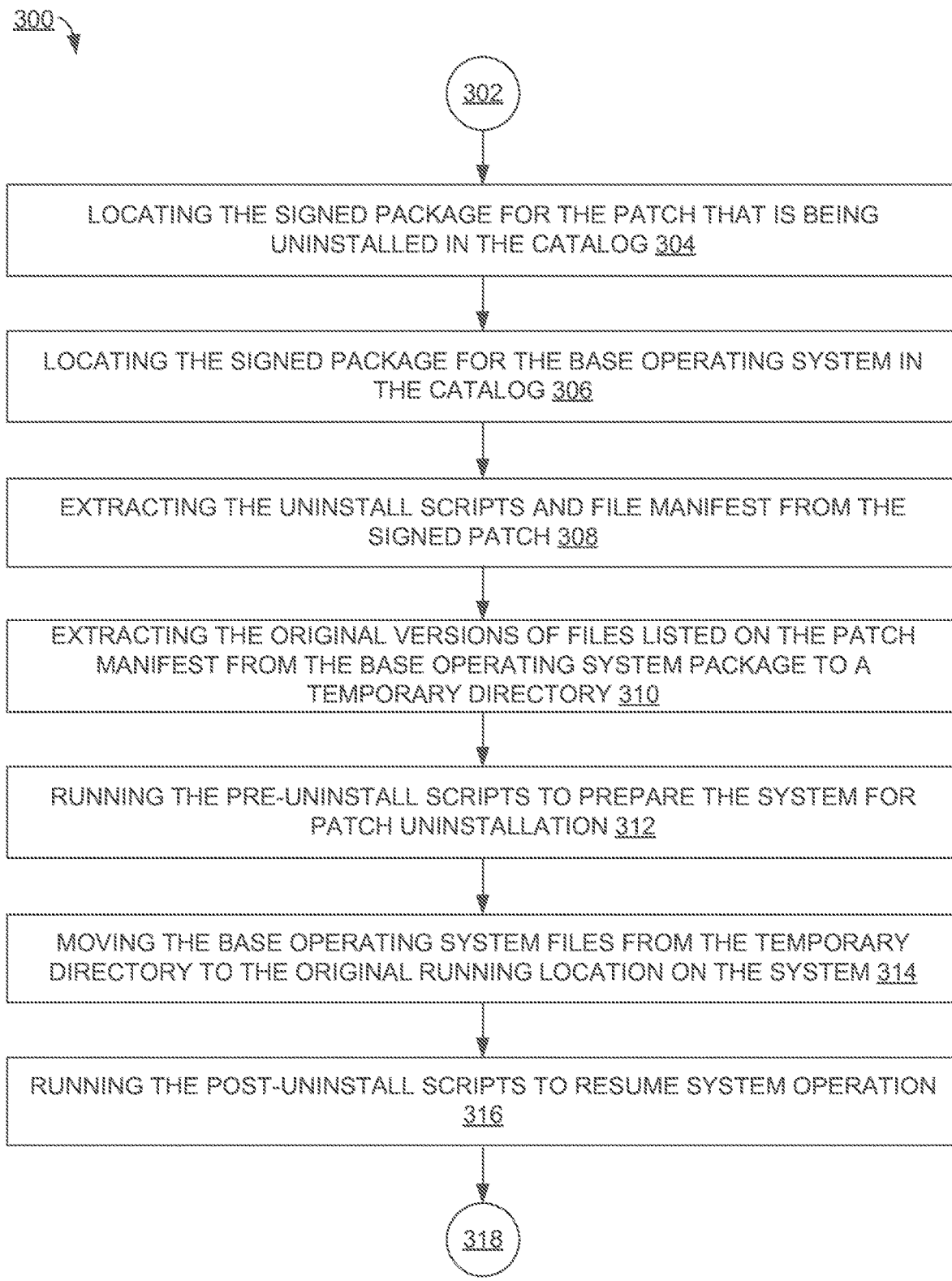
FIG. 3 illustrates an example process flow that can facilitate patch uninstallation using a signed operating system install package, in accordance with an embodiment of this disclosure.

FIG. 3 illustrates an example process flow 300 that can facilitate patch uninstallation using a signed operating system install package, in accordance with an embodiment of this disclosure. In some examples, one or more embodiments of process flow 300 can be implemented by patch uninstallation using a signed operating system install package component 108 of FIG. 1, or computing environment 1200 of FIG. 12.

It can be appreciated that the operating procedures of process flow 300 are example operating procedures, and that there can be embodiments that implement more or fewer operating procedures than are depicted, or that implement the depicted operating procedures in a different order than as depicted. In some examples, process flow 300 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, and/or process flow 1100 of FIG. 11.

Process flow 300 begins with 302, and moves to operation 304. Operation 304 depicts locating the signed package for the patch that is being uninstalled in the catalog. This can comprise locating the original patch package. This can make use of a patch catalog to store previously installed packages on the cluster. If the package is not currently located in the catalog cluster, then it can be re-downloaded from an official source and re-imported into the catalog. In some examples, only officially signed packages can be imported into the catalog.

After operation 304, process flow 300 moves to operation 306.

Operation 306 depicts locating the signed package for the base operating system in the catalog. Similar to operation 304 regarding locating the original patch package, this can comprise locating the original operating system package for the operating system running on the node. If the package is not currently located in the catalog cluster, then it can be re-downloaded from an official source and re-imported into the catalog. In some examples, only officially signed packages can be imported into the catalog.

After operation 306, process flow 300 moves to operation 308.

Operation 308 depicts extracting the uninstall scripts and file manifest from the signed patch. In some examples, each patch contains a file manifest that contains a list of files that will be replaced with versions included in the patch. In some examples, a patch can also include one or more scripts to run at various points in a patch application process and a patch removal process.

After operation 308, process flow 300 moves to operation 310.

Operation 310 depicts extracting the original versions of files listed on the patch manifest from the base operating system package to a temporary directory. When uninstalling a patch, a manifest obtained in operation 308 can indicate which files were modified by the patch and will need to be restored using the original operating system upgrade package. These files can be extracted from the signed package in the catalog and stored in a secure temporary directory.

After operation 310, process flow 300 moves to operation 312.

Operation 312 depicts running the pre-uninstall scripts to prepare the system for patch uninstallation. These pre-uninstall scripts can involve performing functions like stopping services. These pre-install scripts can have been obtained at operation 308, and be run at an appropriate point in the process.

After operation 312, process flow 300 moves to operation 314.

Operation 314 depicts moving the base operating system files from the temporary directory to the original running location on the system. In some examples, here, patched versions of any files modified by the patch can be replaced by versions retrieved from the signed operating system upgrade package in the node's root filesystem.

After operation 314, process flow 300 moves to operation 316.

Operation 316 depicts running the post-uninstall scripts to resume system operation. Similar to operation 312 with regard to pre-uninstall scripts, these post-uninstall scripts can involve performing functions like starting services and updating configurations. These post-install scripts can have been obtained at operation 308, and be run at an appropriate point in the process.

After operation 316, process flow 300 moves to 318, where process flow 300 ends.

Figure 4:
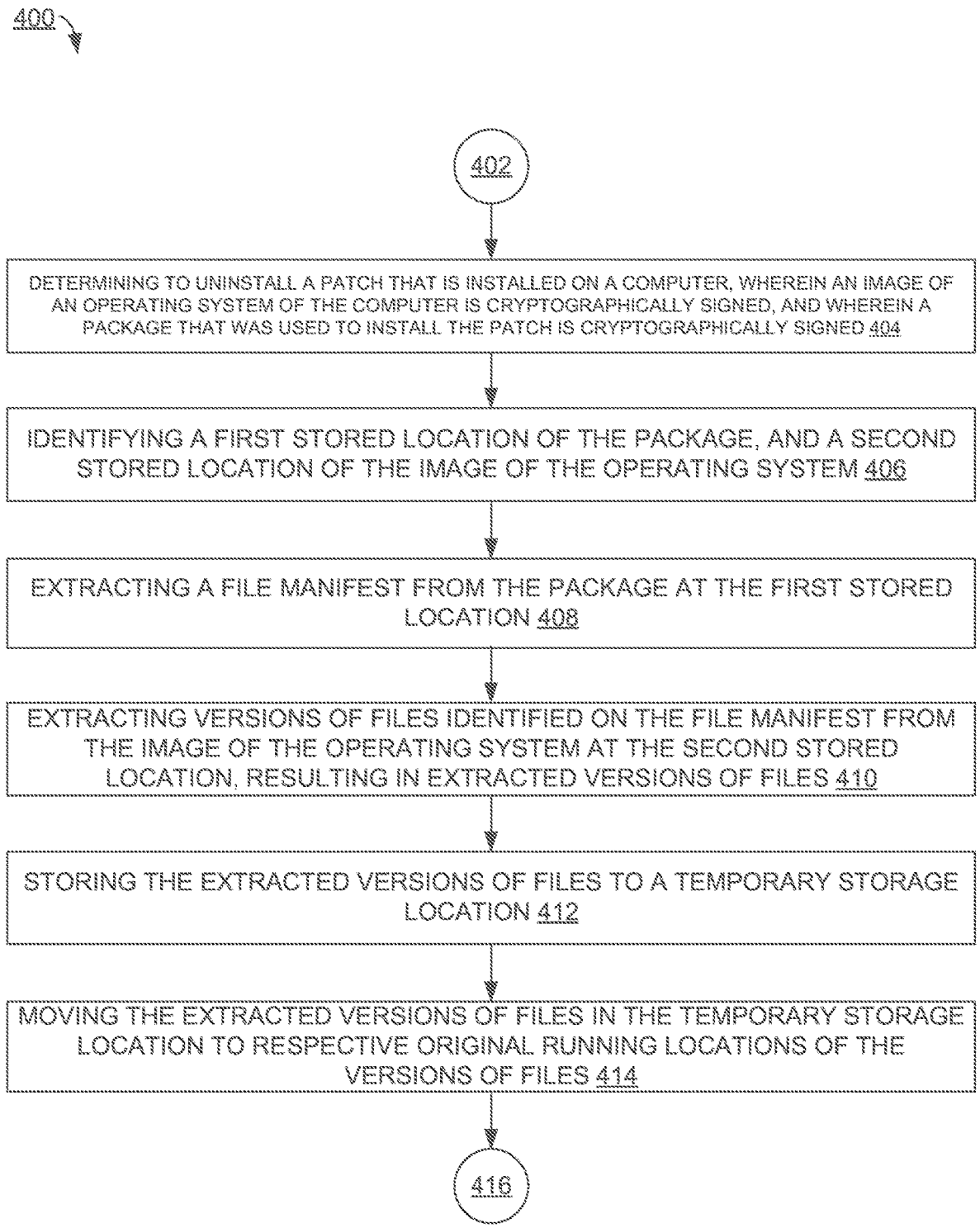
FIG. 4 illustrates an example process flow that can facilitate patch uninstallation using a signed operating system install package, in accordance with an embodiment of this disclosure.

FIG. 4 illustrates an example process flow 400 that can facilitate patch uninstallation using a signed operating system install package, in accordance with an embodiment of this disclosure. In some examples, one or more embodiments of process flow 400 can be implemented by patch uninstallation using a signed operating system install package component 108 of FIG. 1, or computing environment 1200 of FIG. 12.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 300 of FIG. 3, process flow 500 of FIG. 5, process flow 600 of FIG. 6, process flow 700 of FIG. 7, process flow 800 of FIG. 8, process flow 900 of FIG. 9, process flow 1000 of FIG. 10, and/or process flow 1100 of FIG. 11.

Process flow 400 begins with 402, and moves to operation 404. Operation 404 depicts determining to uninstall a patch that is installed on a computer, wherein an image of an operating system of the computer is cryptographically signed, and wherein a package that was used to install the patch is cryptographically signed. That is, there can be an installed patch that was installed from a signed package, where an image used to install the operating system was also signed. It can be determined in operation 404 to uninstall this patch.

In some examples, the operating system is cryptographically signed with a verifiable chain-of-trust back to a certificate authority. That is, the operating system is not self-signed or otherwise signed in a manner that lacks a verifiable chain-of-trust back to a certificate authority.

In some examples, the patch is cryptographically signed with a verifiable chain-of-trust back to a certificate authority. That is, the patch is not self-signed or otherwise signed in a manner that lacks a verifiable chain-of-trust back to a certificate authority.

In some examples, process flow 400 omits performance of the operations with respect to a cryptographically signed uninstall package for the patch. That is, it can be that only signed packages (or images, etc.) are used in the present techniques. And a use of unsigned packages can lead to security risks.

After operation 404, process flow 400 moves to operation 406.

Operation 406 depicts identifying a first stored location of the package, and a second stored location of the image of the operating system. This can comprise determining where the installation package and the operating system image are located. In some examples, operation 406 can be implemented in a similar manner as operations 304-306 of FIG. 3.

After operation 406, process flow 400 moves to operation 408.

Operation 408 depicts extracting a file manifest from the package at the first stored location. That is, a file manifest for the installation package can be extracted from the package. This can be implemented in a similar manner as operation 308 of FIG. 3.

After operation 408, process flow 400 moves to operation 410.

Operation 410 depicts extracting versions of files identified on the file manifest from the image of the operating system at the second stored location, resulting in extracted versions of files. This can comprise using the file manifest to find corresponding files in the operating system image. This can be implemented in a similar manner as operation 310 of FIG. 3.

After operation 410, process flow 400 moves to operation 412.

Operation 412 depicts storing the extracted versions of files to a temporary storage location. This can comprise moving the operating system files in operation 410 to a temporary directory. This can be implemented in a similar manner as operation 310 of FIG. 3.

In some examples, the temporary storage location comprises a secure temporary storage location. In some examples, the temporary storage location can be secured by configuring file system permissions to restrict access to files in the temporary storage location to an entity that placed the files in the temporary storage location.

After operation 412, process flow 400 moves to operation 414.

Operation 414 depicts moving the extracted versions of files in the temporary storage location to respective original running locations of the versions of files. This can comprise moving the files from the temporary directory to their intended position in the file system when they are installed. This can be implemented in a similar manner as operation 314 of FIG. 3.

After operation 414, process flow 400 moves to 416, where process flow 400 ends.

Figure 5:
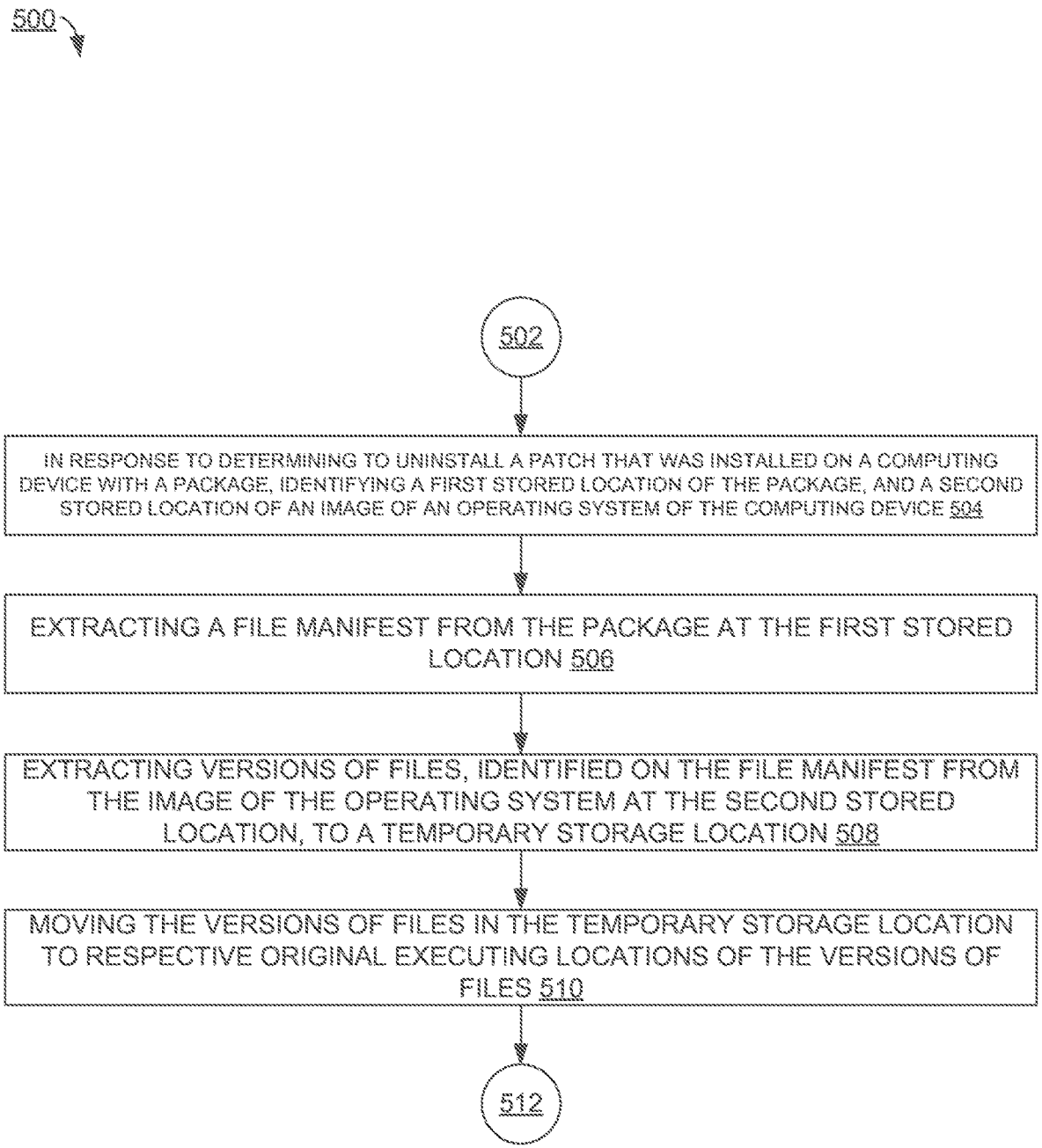
FIG. 5 illustrates an example process flow that can facilitate patch uninstallation using a signed operating system install package, in accordance with an embodiment of this disclosure.

FIG. 5 illustrates an example process flow 500 that can facilitate patch uninstallation using a signed operating system install package, in accordance with an embodiment of this disclosure. In some examples, one or more embodiments of process flow 500 can be implemented by patch uninstallation using a signed operating system install package component 108 of FIG. 1, or computing environment 1200 of FIG. 12.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 300 of FIG. 3, process flow 400 of FIG. 4, process flow 600 of FIG. 6, process flow 700 of FIG. 7, process flow 800 of FIG. 8, process flow 900 of FIG. 9, process flow 1000 of FIG. 10, and/or process flow 1100 of FIG. 11.

Process flow 500 begins with 502, and moves to operation 504. Operation 504 depicts, in response to determining to uninstall a patch that was installed on a computing device with a package, identifying a first stored location of the package, and a second stored location of an image of an operating system of the computing device. In some examples, operation 504 can be implemented in a similar manner as operation 404 of FIG. 4.

In some examples, the image of the operating system is cryptographically signed, and wherein the package is cryptographically signed.

In some example, the first stored location of the package comprises a package catalog that is maintained for a computing cluster, and wherein the computing cluster comprises the computing device. That is, a package catalog can be used to store previously installed packages locally on a cluster (or other computing device, where the present techniques are implemented on another computing device).

In some examples, the package comprises a script to execute when applying or removing the patch, and an identification of point when applying or removing the patch to execute the script. That is, a package can include a number of scripts to run at various points in a patch application process, and a patch removal process."

After operation 504, process flow 500 moves to operation 506.

Operation 506 depicts extracting a file manifest from the package at the first stored location. In some examples, operation 506 can be implemented in a similar manner as operation 408 of FIG. 4.

In some examples, the file manifest identifies a list of files stored on the computing device that are replaced with versions of files included in the patch. That is, a patch can comprise a file manifest that contains a list of files that are to be replaced with versions of those files that are included in the patch.

After operation 506, process flow 500 moves to operation 508.

Operation 508 depicts extracting versions of files, identified on the file manifest from the image of the operating system at the second stored location, to a temporary storage location. In some examples, operation 508 can be implemented in a similar manner as operations 410-412 of FIG. 4.

After operation 508, process flow 500 moves to operation 510.

Operation 510 depicts moving the versions of files in the temporary storage location to respective original executing locations of the versions of files. In some examples, operation 510 can be implemented in a similar manner as operation 414 of FIG. 4.

After operation 510, process flow 500 moves to 512, where process flow 500 ends.

FIG. 6 illustrates an example process flow 600 that can facilitate patch uninstallation using a signed operating system install package, in accordance with an embodiment of this disclosure. In some examples, one or more embodiments of process flow 600 can be implemented by patch uninstallation using a signed operating system install package component 108 of FIG. 1, or computing environment 1200 of FIG. 12.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 300 of FIG. 3, process flow 400 of FIG. 4, process flow 500 of FIG. 5, process flow 700 of FIG. 7, process flow 800 of FIG. 8, process flow 900 of FIG. 9, process flow 1000 of FIG. 10, and/or process flow 1100 of FIG. 11.

Process flow 600 begins with 602, and moves to operation 604. Operation 604 depicts, in response to determining to uninstall a patch that was installed on a computer with a package, extracting a file manifest from the package. In some examples, operation 604 can be implemented in a similar manner as operations 404-408 of FIG. 4.

After operation 604, process flow 600 moves to operation 606.

Operation 606 depicts extracting versions of files identified on the file manifest from an image of an operating system that is installed on the computer to a temporary storage location. In some examples, operation 606 can be implemented in a similar manner as operations 410-412 of FIG. 4.

In some examples, the image of the operating system is stored in a root filesystem of the computer. That is, when installed, a signed operating system upgrade package can be stored in a root filesystem of a node upon which the signed operating system upgrade package was installed.

In some examples, the package is signed with a first verifiable chain-of-trust back to a certificate authority. In some examples, the image of the operating system is signed with a second verifiable chain-of-trust back to the certificate authority. That is, Both of these packages will be officially signed with verifiable chain-of-trust back to the certificate authority.

After operation 606, process flow 600 moves to operation 608.

Operation 608 depicts moving the versions of files in the temporary storage location to respective original running locations of the versions of files. In some examples, operation 608 can be implemented in a similar manner as operation 414 of FIG. 4.

In some examples, files that were modified by installing the patch are restored using corresponding original versions of files from the image of the operating system. That is, when uninstalling a patch, a manifest can indicate which files were modified by the patch and will be restored using the original operating system upgrade package.

After operation 608, process flow 600 moves to 610, where process flow 600 ends.

Figure 7:
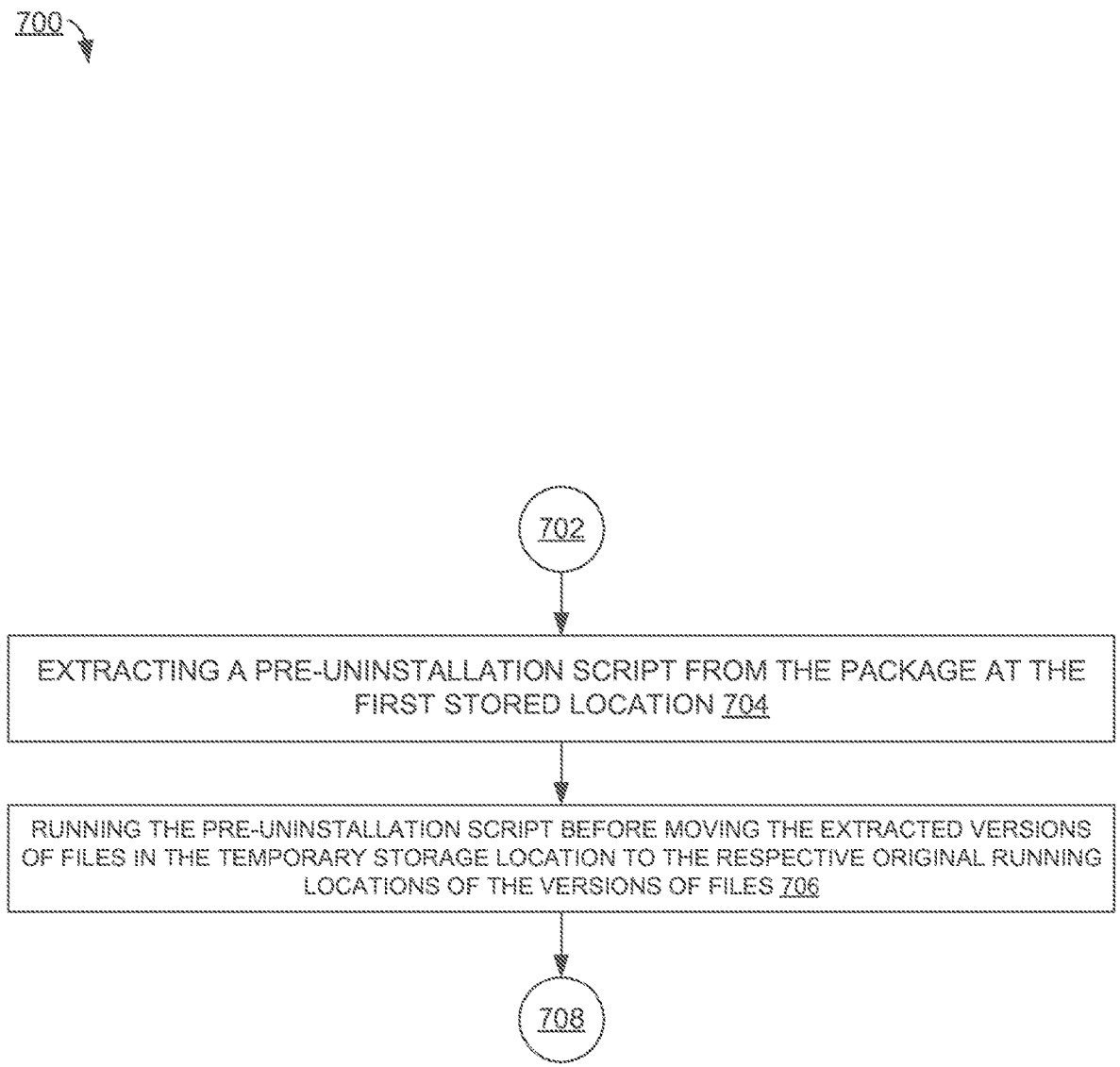
FIG. 7 illustrates an example process flow that can facilitate patch uninstallation using a signed operating system install package, in accordance with an embodiment of this disclosure.

FIG. 7 illustrates an example process flow 700 that can facilitate patch uninstallation using a signed operating system install package, in accordance with an embodiment of this disclosure. In some examples, one or more embodiments of process flow 700 can be implemented by patch uninstallation using a signed operating system install package component 108 of FIG. 1, or computing environment 1200 of FIG. 12.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 300 of FIG. 3, process flow 400 of FIG. 4, process flow 500 of FIG. 5, process flow 600 of FIG. 6, process flow 800 of FIG. 8, process flow 900 of FIG. 9, process flow 1000 of FIG. 10, and/or process flow 1100 of FIG. 11.

Process flow 700 begins with 702, and moves to operation 704. Operation 704 depicts extracting a pre-uninstallation script from the package at the first stored location. That is, a package can comprise one or more pre-uninstallation scripts that are run as part of uninstalling a patch that was installed via the package.

After operation 704, process flow 700 moves to operation 706.

Operation 706 depicts running the pre-uninstallation script before moving the extracted versions of files in the temporary storage location to the respective original running locations of the versions of files. The pre-uninstallation script can perform functions such as stopping one or more services on a computer upon which the uninstallation is being performed.

After operation 706, process flow 700 moves to 708, where process flow 700 ends.

Figure 8:
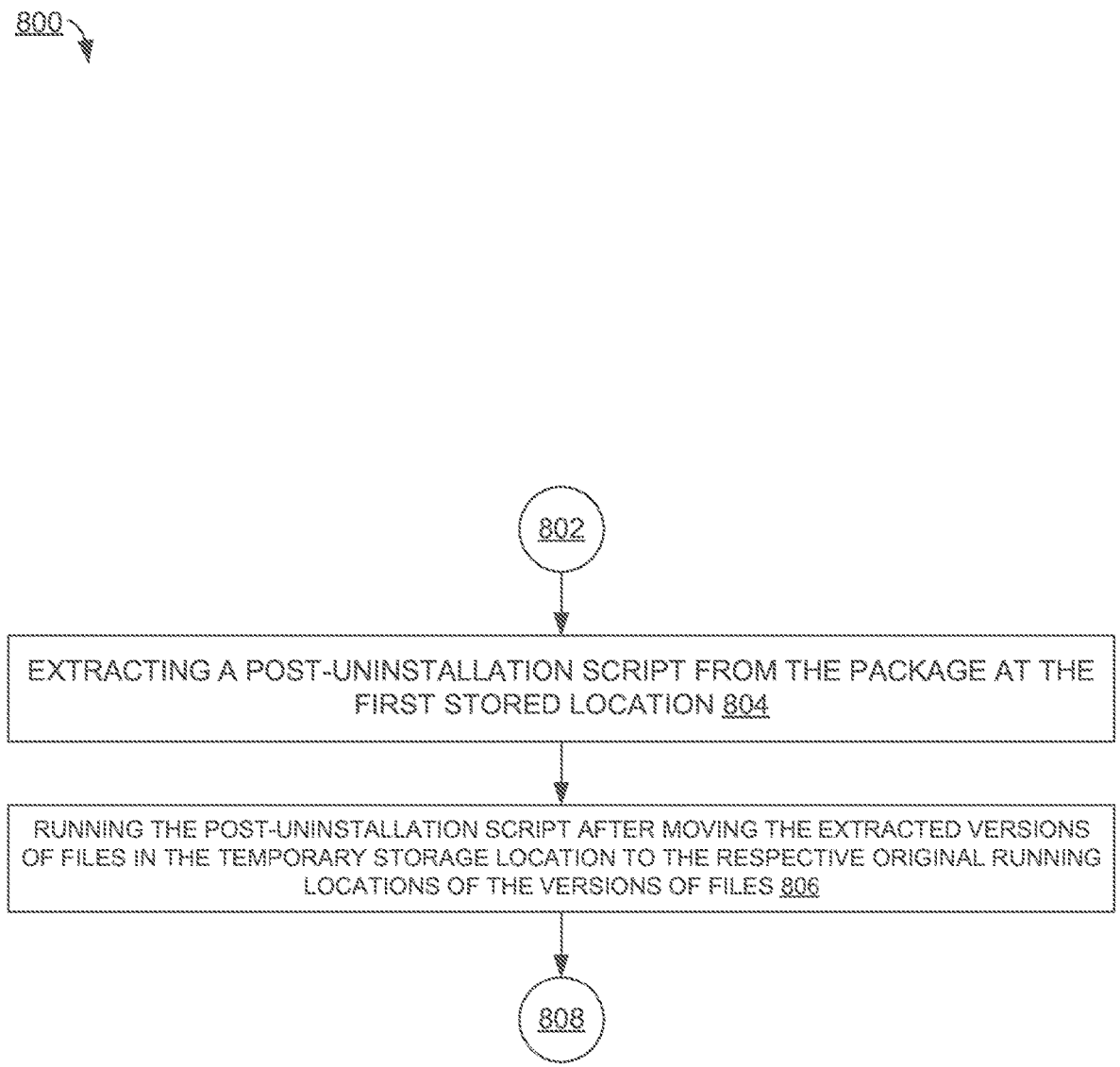
FIG. 8 illustrates an example process flow that can facilitate patch uninstallation using a signed operating system install package, in accordance with an embodiment of this disclosure.

FIG. 8 illustrates an example process flow 800 that can facilitate patch uninstallation using a signed operating system install package, in accordance with an embodiment of this disclosure. In some examples, one or more embodiments of process flow 800 can be implemented by patch uninstallation using a signed operating system install package component 108 of FIG. 1, or computing environment 1200 of FIG. 12.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 900 of FIG. 9, process flow 1000 of FIG. 10, and/or process flow 1100 of FIG. 11.

Process flow 800 begins with 802, and moves to operation 804. Operation 804 depicts extracting a post-uninstallation script from the package at the first stored location. That is, a package can comprise one or more post-uninstallation scripts that are run as part of uninstalling a patch that was installed via the package.

After operation 804, process flow 800 moves to operation 806.

Operation 806 depicts running the post-uninstallation script after moving the extracted versions of files in the temporary storage location to the respective original running locations of the versions of files. The post-uninstallation script can perform functions such as starting (or restarting) one or more services on a computer upon which the uninstallation is being performed, or updating a configuration of the computer.

After operation 806, process flow 800 moves to 808, where process flow 800 ends.

FIG. 9 illustrates an example process flow 900 that can facilitate patch uninstallation using a signed operating system install package, in accordance with an embodiment of this disclosure. In some examples, one or more embodiments of process flow 900 can be implemented by patch uninstallation using a signed operating system install package component 108 of FIG. 1, or computing environment 1200 of FIG. 12.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 800 of FIG. 8, process flow 1000 of FIG. 10, and/or process flow 1100 of FIG. 11.

Process flow 900 begins with 902, and moves to operation 904. Operation 904 depicts determining that the package is omitted from a package catalog maintained by a computing cluster that comprises the computing device. That is, it can be determined that there is no locally-stored copy of the package.

After operation 904, process flow 900 moves to operation 906.

Operation 906 depicts downloading the package from a remote computing device associated with an owner of the package, wherein the remote computing device is the first stored location. That is, where there is no locally-stored copy of the package, a copy of the package can be re-downloaded from an official source, such as remote server 222 in the example of FIG. 2.

After operation 906, process flow 900 moves to 908, where process flow 900 ends.

FIG. 10 illustrates an example process flow 1000 that can facilitate patch uninstallation using a signed operating system install package, in accordance with an embodiment of this disclosure. In some examples, one or more embodiments of process flow 1000 can be implemented by patch uninstallation using a signed operating system install package component 108 of FIG. 1, or computing environment 1200 of FIG. 12.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, and/or process flow 1100 of FIG. 11.

Process flow 1000 begins with 1002, and moves to operation 1004. Operation 1004 comprises downloading the package, resulting in a downloaded package. This can be implemented in a similar manner as operation 906 of FIG. 9.

After operation 1004, process flow 1000 moves to operation 1006.

Operation 1006 depicts storing the downloaded package in the package catalog. That is, once a package is re-downloaded, it can be stored locally. Using the example of FIG. 2, where cluster 202 (e.g., via patch uninstallation using a signed operating system install package component 208) downloads patch package 212 from remote server 222, cluster 202 can then store a copy of patch package 212 in catalog 210.

After operation 1006, process flow 1000 moves to 1008, where process flow 1000 ends.

Figure 11:
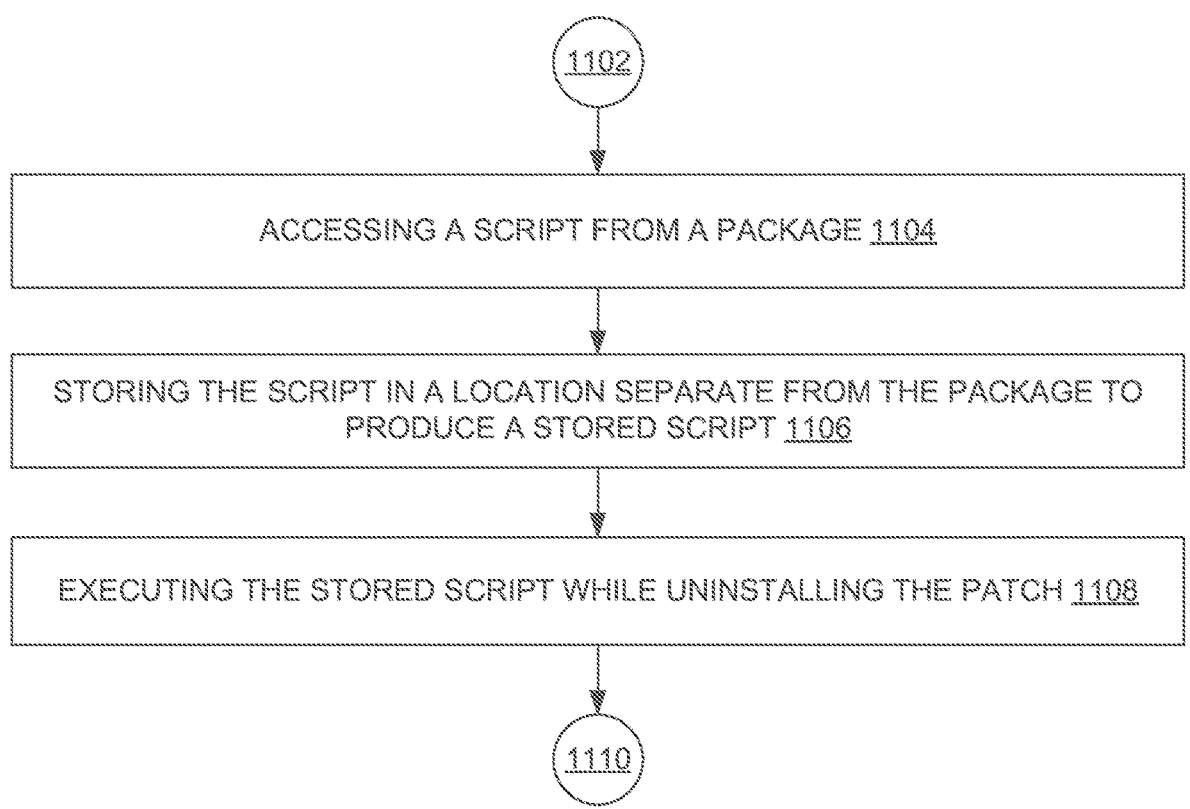
FIG. 11 illustrates an example process flow that can facilitate patch uninstallation using a signed operating system install package, in accordance with an embodiment of this disclosure.

FIG. 11 illustrates an example process flow 1100 that can facilitate patch uninstallation using a signed operating system install package, in accordance with an embodiment of this disclosure. In some examples, one or more embodiments of process flow 1100 can be implemented by patch uninstallation using a signed operating system install package component 108 of FIG. 1, or computing environment 1200 of FIG. 12.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, and/or process flow 1000 of FIG. 10.

Process flow 1100 begins with 1102, and moves to operation 1104. Operation 1104 depicts accessing a script from a package. That is, as described herein, a manifest of a patch installation package can identify one or more scripts in the package, and these scripts can be extracted from the manifest.

After operation 1104, process flow 1100 moves to operation 1106.

Operation 1106 depicts storing the script in a location separate from the package to produce a stored script. In some examples, this location can be a secure temporary storage location that is similar to temporary directory 218 of FIG. 2.

After operation 1106, process flow 1100 moves to operation 1108.

Operation 1108 depicts executing the stored script while uninstalling the patch. That is, running uninstallation scripts can be performed by using a copy of those scripts that are stored in the location of operation 1106.

After operation 1108, process flow 1100 moves to 1110, where process flow 1000 ends.

Example Operating Environment

In order to provide additional context for various embodiments described herein, FIG. 12 and the following discussion are intended to provide a brief, general description of a suitable computing environment 1200 in which the various embodiments of the embodiment described herein can be implemented.

For example, parts of computing environment 1200 can be used to implement one or more embodiments of cluster 102 of FIG. 1, and/or cluster 202 and/or remote server 222 of FIG. 2.

In some examples, computing environment 1200 can implement one or more embodiments of the process flows of FIGS. 3-11 to facilitate patch uninstallation using a signed operating system install package.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a nonvolatile storage such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1294 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1294 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/ storage device 1252. It will be appreciated that the network connections shown are examples, and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
determining to uninstall a patch that is installed on a computer, wherein an image of an operating system of the computer is cryptographically signed, and wherein a package that was used to install the patch is cryptographically signed; and
in response to the determining to uninstall the patch,
identifying a first stored location of the package, and a second stored location of the image of the operating system,
extracting a file manifest from the package at the first stored location;
extracting versions of files identified on the file manifest from the image of the operating system at the second stored location, wherein the file manifest indicates files from the operating system that were overwritten with files from the package as part of previously installing the patch, resulting in extracted versions of files,
storing the extracted versions of files to a temporary storage location, and
moving the extracted versions of files in the temporary storage location to respective original running locations of the versions of files.

2. The system of claim 1, wherein the system omits performance of the operations with respect to a cryptographically signed uninstall package for the patch.

3. The system of claim 1, wherein the operations further comprise:
extracting a pre-uninstallation script from the package at the first stored location; and
running the pre-uninstallation script before moving the extracted versions of files in the temporary storage location to the respective original running locations of the versions of files.

4. The system of claim 1, wherein the operations further comprise:
extracting a post-uninstallation script from the package at the first stored location; and
running the post-uninstallation script after moving the extracted versions of files in the temporary storage location to the respective original running locations of the versions of files.

5. The system of claim 1, wherein the operating system is cryptographically signed with a verifiable chain-of-trust back to a certificate authority.

6. The system of claim 1, wherein the patch is cryptographically signed with a verifiable chain-of-trust back to a certificate authority.

7. The system of claim 1, wherein the temporary storage location comprises a secure temporary storage location.

8. A method, comprising:
determining to uninstall a patch that is installed on a computing device, wherein an image of an operating system of the computing device is cryptographically signed, and wherein a package that was used to install the patch is cryptographically signed;
in response to the determining, identifying, by the system, a first stored location of the package, and a second stored location of an image of an operating system of the computing device;
in response to the determining, extracting, by the system, a file manifest from the package at the first stored location;
in response to the determining, extracting, by the system, versions of files, identified on the file manifest from the image of the operating system at the second stored location, to a temporary storage location, wherein the file manifest indicates files from the operating system that were overwritten with files from the package as part of previously installing the patch, resulting in extracted versions of files;
in response to the determining, storing the extracted versions of files to a temporary storage location; and
in response to the determining, moving, by the system, the versions of files in the temporary storage location to respective original executing locations of the versions of files.

9. The method of claim 8, wherein the first stored location of the package comprises a package catalog that is maintained for a computing cluster, and wherein the computing cluster comprises the computing device.

10. The method of claim 8, wherein identifying the first stored location of the package comprises:
determining, by the system, that the package is omitted from a package catalog maintained by a computing cluster that comprises the computing device; and
downloading, by the system, the package from a remote computing device associated with an owner of the package, wherein the remote computing device is the first stored location.

11. The method of claim 10, wherein downloading the package results in a downloaded package, and further comprising:
storing, by the system, the downloaded package in the package catalog.

12. The method of claim 8, wherein the file manifest identifies a list of files stored on the computing device that are replaced with versions of files included in the patch.

13. The method of claim 8, wherein the package comprises a script to execute when applying or removing the patch, and an identification of point when applying or removing the patch to execute the script.

14. The method of claim 13, further comprising:

accessing, by the system, the script from the package;

storing, by the system, the script in a location separate from the package to produce a stored script; and executing, by the system, the stored script while uninstalling the patch.

15. A non-transitory computer-readable medium comprising instructions that, in response to execution, cause a system comprising a processor to perform operations, comprising:

determining to uninstall a patch that was installed on a computer with a package, wherein an image of an operating system of the computer is cryptographically signed, and wherein the package is cryptographically signed, identifying a first stored location of the package, and a second stored location of the image of the operating system;

in response to the determining, extracting a file manifest from the package;

in response to the determining, extracting versions of files identified on the file manifest from the image of an operating system, wherein the file manifest indicates files from the operating system that were overwritten with files from the package as part of previously installing the patch, resulting in extracted versions of files that are stored in a temporary storage location; and in response to the determining, moving the versions of files in the temporary storage location to respective original running locations of the versions of files.

16. The non-transitory computer-readable medium of claim 15, wherein files that were modified by installing the patch are restored using corresponding original versions of files from the image of the operating system.

17. The non-transitory computer-readable medium of claim 15, wherein the image of the operating system is stored in a root filesystem of the computer.

18. The non-transitory computer-readable medium of claim 15, wherein the package is signed with a first verifiable chain-of-trust back to a certificate authority.

19. The non-transitory computer-readable medium of claim 18, wherein the image of the operating system is signed with a second verifiable chain-of-trust back to the certificate authority.

20. The method of claim 8, wherein the system omits performance of the operations with respect to a cryptographically signed uninstall package for the patch.

\* \* \* \* \*